T. J. TUBB & L. M. SHELDON.
VEHICLE BRAKE SHOE AND HOLDER.
APPLICATION FILED MAR. 17, 1908.
910,101.
Patented Jan. 19, 1909.
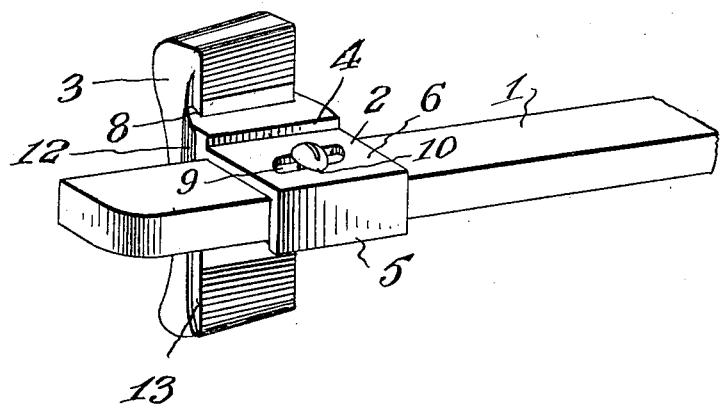
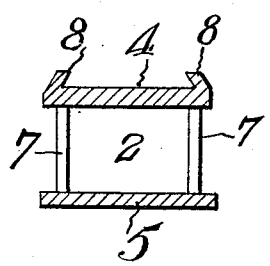
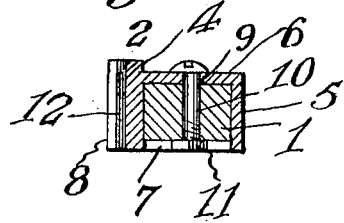
Witnesses:
Joe. P. Wahler
C. C. Hines
Inventors,
Thomas J. Tubb,
Lon M. Sheldon,
By Victor J. Evans.
Attorney.

UNITED STATES PATENT OFFICE.

THOMAS J. TUBB AND LON M. SHELDON, OF McGIRK, TEXAS.

VEHICLE BRAKE-SHOE AND HOLDER.

No. 910,101.    Specification of Letters Patent.    Patented Jan. 19, 1909.

Application filed March 17, 1908. Serial No. 421,723.

*To all whom it may concern:*

Be it known that we, THOMAS J. TUBB and LON M. SHELDON, citizens of the United States, residing at McGirk, in the county of Hamilton and State of Texas, have invented new and useful Improvements in Vehicle Brake-Shoes and Holders, of which the following is a specification.

This invention relates to brake shoes and holders for wagons and like vehicles, the object in view being to provide a brake shoe which is readily removable from its holder for renewal or repairs, in which the holder is adjustable on the brake beam or bar to set the shoe to accurately engage the wheel, and in which a simple construction of holder is provided to securely hold the shoe and which is adapted to facilitate manipulation of its fastening means for its adjustment.

The invention consists of the features of construction, combination and arrangement of parts hereinafter fully described and claimed, reference being had to the accompanying drawing, in which:—

Figure 1 is a perspective view of the end of a brake beam equipped with the invention. Fig. 2 is a horizontal section through the holder. Fig. 3 is a central vertical front to rear section through the same and the brake beam.

Referring to the drawing, the numeral 1 designates a brake bar or beam, 2 the brake shoe holder, and 3 the brake shoe.

The holder 2 is slidably mounted upon the end of the beam and comprises a metallic socket open at each side for passage of the beam therethrough and embodying a front wall 4, a rear wall 5, a top wall 6 and an open or skeleton bottom wall formed by a pair of spaced webs or braces 7 connecting the lower edges of the front and back wall. The front wall 4 is thickened to provide a strong supporting surface for the brake shoe, and is formed at its sides with forwardly projecting dovetailed retaining lugs or flanges 8. The top wall 6 of the said holder is provided with a longitudinal slot 9 for the downward passage of a securing bolt 10 which extends downward through an opening in the bar or beam 1 and is provided at its lower end with a retaining nut 11. This nut bears against the underside of the beam and is exposed through the opening or space between the webs 7 to permit of its ready application and removal.

It will be seen from the foregoing description that while the bolt 10 is stationary and normally clamps the holder in position by engagement of its head with the upper wall 6, by merely loosening the bolt to a slight extent by the application of a screw driver to its head, the slot 9 will permit adjustment of the holder to a limited extent longitudinally on the beam 1, after which by tightening up the bolt the holder may again be clamped securely in position. As a result, the holder may be shifted to set the shoe 3 to bear firmly and squarely against the face of the tire of the wheel, and to compensate for any disarrangements of the shoe relative to the wheel liable to be caused by the sagging or displacement of the vehicle body from its normal horizontal position. The space or opening in the bottom of the holder not only permits ready application of the securing nut, but facilitates its removal when it is desired to detach the holder from the beam.

The brake shoe 3 may be of conventional form, and consists preferably of a block of wood, metal or other suitable material having a concaved front or bearing face to engage the surface of the wheel and a back face which is at least straight in part to bear against the surface of the front wall 4 of the holder. The sides of the brake shoe are longitudinally cut away to form recesses 12 to receive the retaining lugs or flanges 8 of the holder, and the inner walls 13 of said recesses are dovetailed to snugly engage said lugs or flanges. The recesses and walls extend from points adjacent the upper rear edge of the shoe continuously down the sides of the shoe and through the lower edge thereof, so as to permit the shoe to be inserted from above downward into engagement with the lugs and to be removed by a reverse movement. The walls or surfaces 13 also converge or taper in a downward direction, so that in the application of the shoe the latter may be easily fitted in position and then gradually brought into closed frictional engagement with the lugs 8. As the walls 13 diverge or flare outward upwardly in a gradual manner, the frictional engagement will cause the shoe to be gripped against further downward movement when it has reached a normal operative position.

It will be seen from the foregoing description that the construction described permits of the ready removal of a worn or broken shoe and the convenient substitution of a new shoe therefor, and insures the firm retention of the shoe in its operative position on the holder, which latter may be adjusted to set the shoe in proper relation to the wheel and removed with the shoe when it is desired to fit the same upon a new brake beam. These and other advantages arising from the structural features of the invention will be apparent to those versed in the art and such advantages readily appreciated.

Having thus fully described the invention, what is claimed as new is:—

In a vehicle brake, the combination of a brake beam, a holder embodying a metallic socket fitted thereon, said socket comprising front and back walls, a top wall having a transverse slot and a bottom wall formed with an opening therein, said front wall having dovetailed retaining flanges, a bolt passing downward through said slot and through the beam and having its lower end projecting below the lower surface of the beam, a nut engaging the lower end of the bolt and exposed through the opening in the bottom wall, and a brake shoe having dovetailed portions engaging said flanges.

In testimony whereof we affix our signatures in presence of two witnesses.

THOMAS J. TUBB.
LON M. SHELDON.

Witnesses:
JOHN WELLS,
ARTHUR KINSEY.